United States Patent [19]

Streichenberger

[11] 4,257,350

[45] Mar. 24, 1981

[54] METHOD AND DEVICE FOR PRACTICING MARINE AQUACULTURE

[75] Inventor: Rodolphe H. Streichenberger, Nantes, France

[73] Assignees: Francis Devin, Nantes; Camille Lemarchand, Cellier; Antonius Streichenberger, Nantes, all of France

[21] Appl. No.: 959,440

[22] Filed: Nov. 9, 1978

[30] Foreign Application Priority Data

Nov. 14, 1977 [FR] France .................. 77 34100
Feb. 6, 1978 [FR] France .................. 78 03178

[51] Int. Cl.³ .............................................. A01K 61/00
[52] U.S. Cl. ................................................... 119/3
[58] Field of Search .................. 119/3, 2, 4; 43/102, 43/103, 7, 6.5

[56] References Cited

U.S. PATENT DOCUMENTS

| | | | |
|---|---|---|---|
| 1,761,365 | 6/1930 | Reed | 43/102 |
| 2,283,472 | 5/1942 | Tuxhorn | 119/3 |
| 3,852,908 | 12/1974 | Christopher | 43/102 |
| 4,084,543 | 4/1978 | Pequegnat | 119/3 |
| 4,086,875 | 5/1978 | Lindbergh | 119/3 |
| 4,137,869 | 2/1979 | Kipping | 119/3 |
| 4,147,130 | 4/1979 | Goguel | 119/3 |

*Primary Examiner*—Hugh R. Chamblee
*Attorney, Agent, or Firm*—Birch, Stewart, Kolasch and Birch

[57] ABSTRACT

A method and device for practicing aquaculture in the open sea which basically comprises a bow net means of rigid construction having means permitting it to float in a partially submerged condition or fully immersed in the water without touching the bottom of the sea. The bow net means includes constant-buoyancy tanks and variable-buoyancy tanks, the latter being adapted to be filled with either air or water.

41 Claims, 21 Drawing Figures

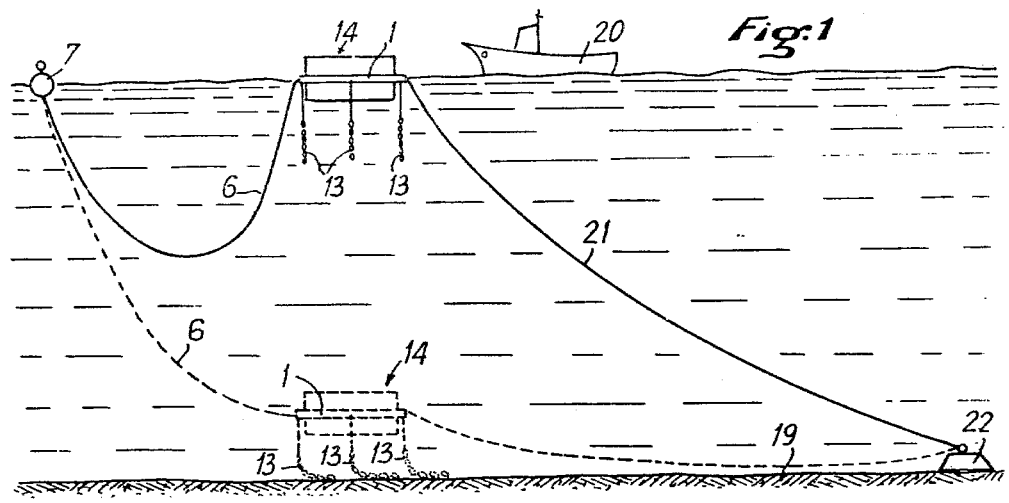
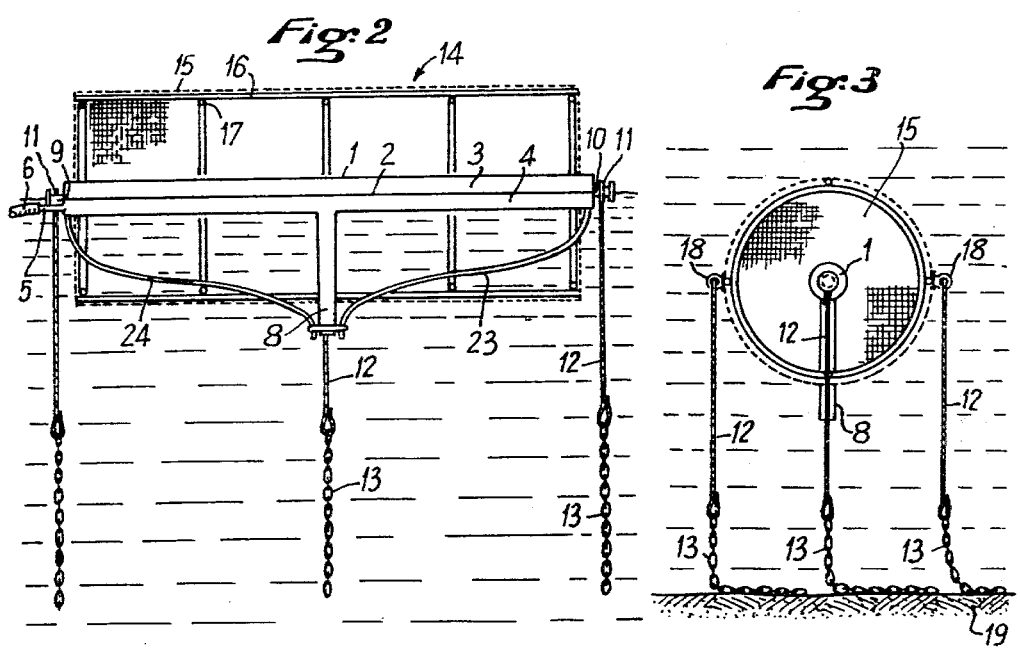
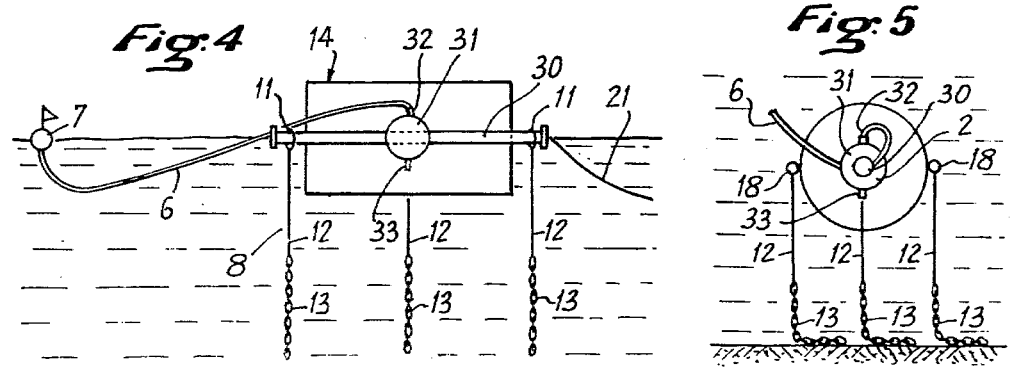

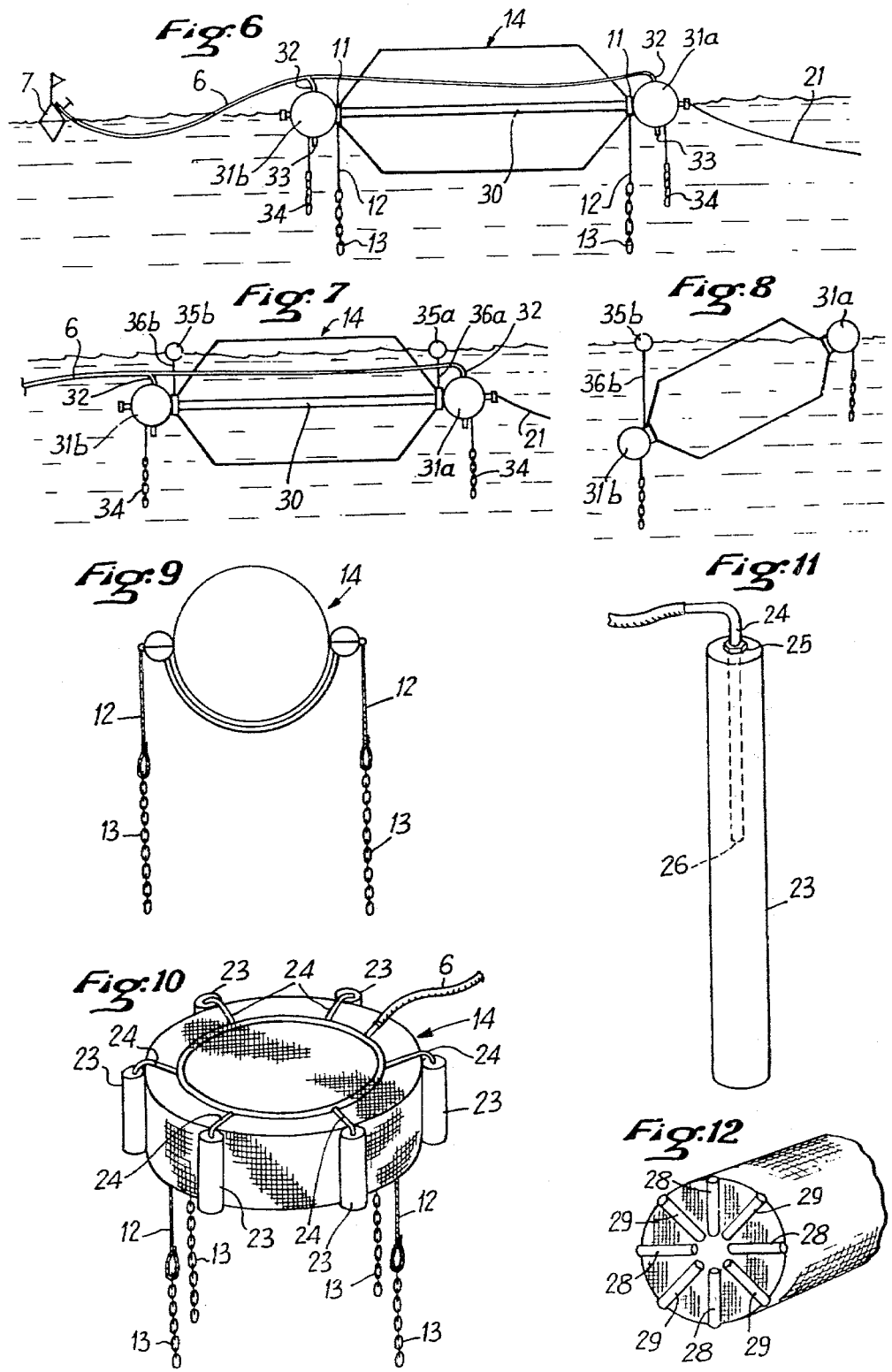

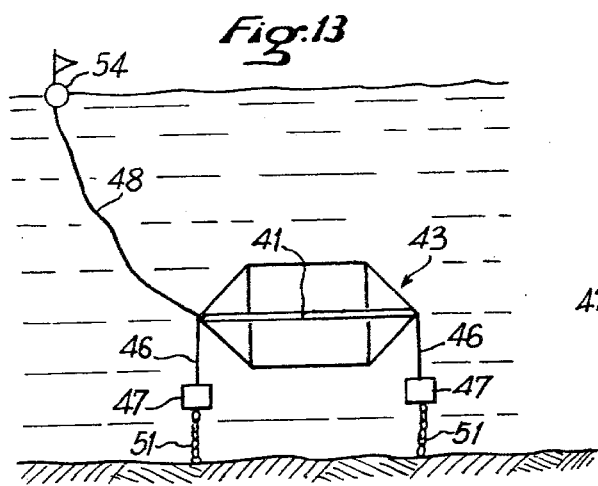
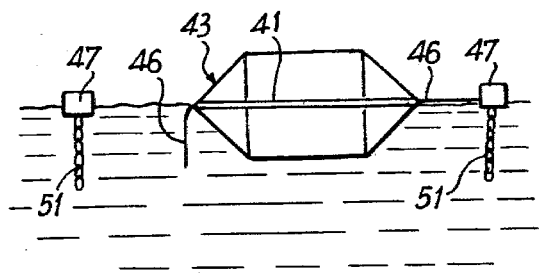
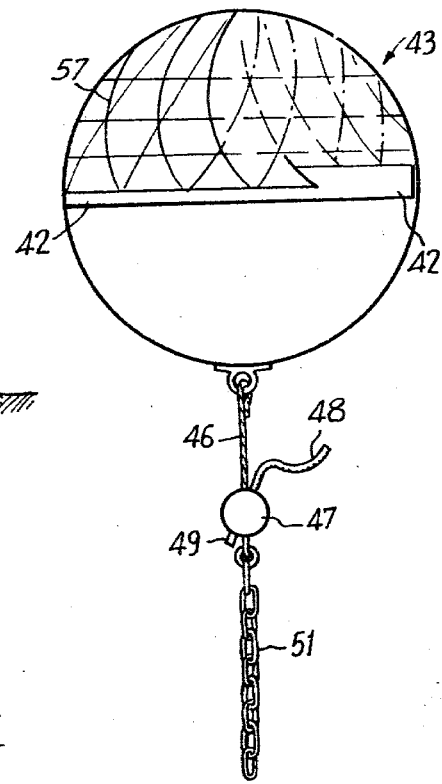
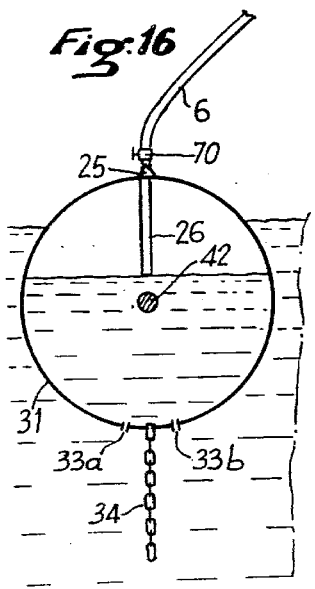
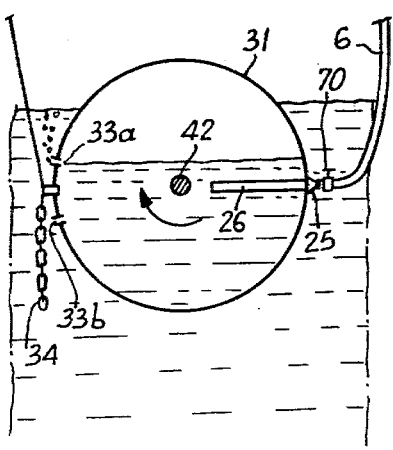
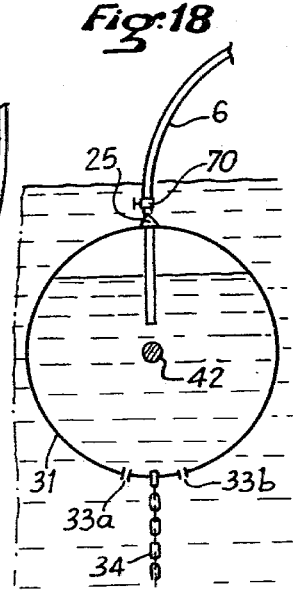

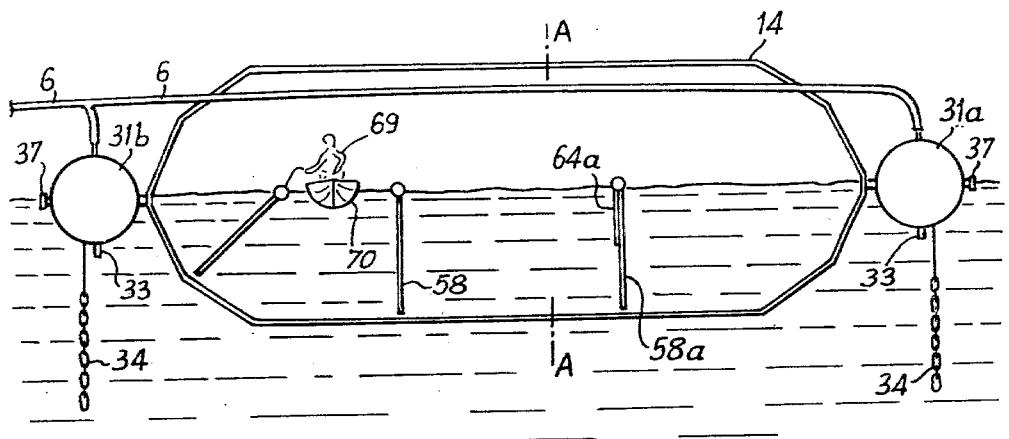
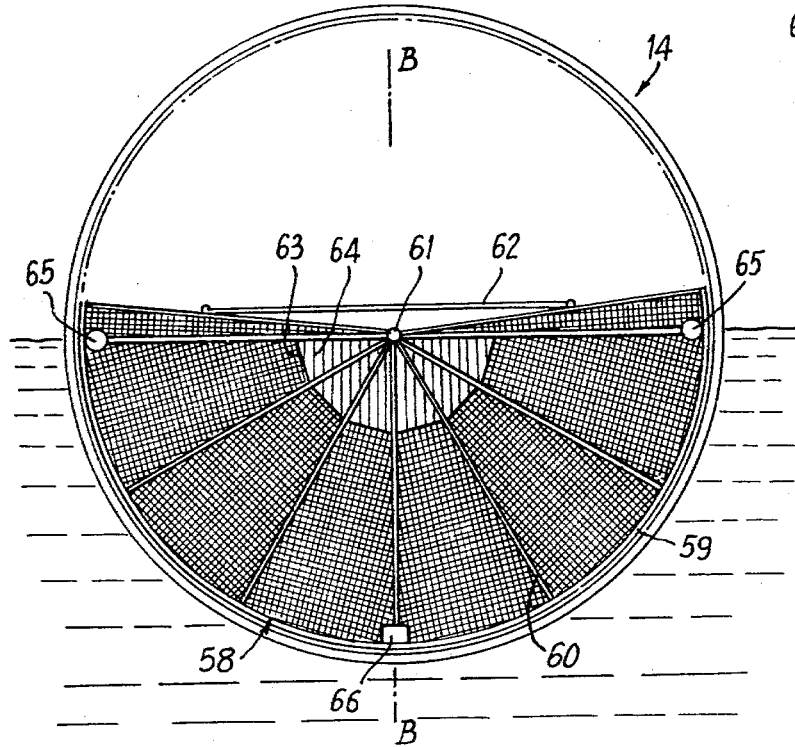
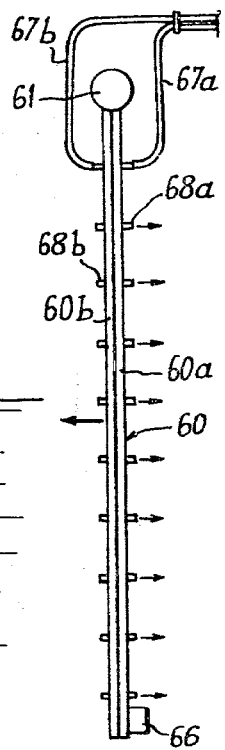

METHOD AND DEVICE FOR PRACTICING MARINE AQUACULTURE

BACKGROUND OF THE INVENTION

The present invention relates to a method and a device for practicing aquaculture in the open sea.

In countries with well-sheltered bays, e.g. deep fjords, one or more enclosures consisting of a net or a netting lying under water are arranged on the surface, and inside are placed recently hatched fishes (e.g. sea or salmon trout) which are fed with the prepared food from a boat. Such enclosures, nets or nettings as presently known in the art form flexible deformable assemblies that are very difficult to handle.

This form of aquaculture cannot be practiced along an inadequately sheltered coastline, as is particularly the case along the coasts of France, because the waves and storms would exhaust the fishes which cannot endure such disturbances without harmful effects and would also deform and end up destroying the enclosures containing the fishes which are in the process of being bred.

Therefore, in the prior art the use of completely sealed enclosures has been suggested which are weighted in such a way that they sink in the water and rest on the bottom of the sea. Unfortunately, it has been found that even on the sea bottom, at a depth propitious to breeding, that is to say, between 0 and 30 meters, said enclosures are not secure from the motions of the water caused by violent storms or by deep sea currents, so that they scrape against the sea bottom and deteriorate and tear, allowing the fishes to escape. Furthermore, it is necessary to lift the enclosures at regular intervals so as to assure proper nourishment of the fishes or to remove algae and other marine growths. This calls for intervention from the boats, which must be equipped with complicated and costly hoisting gear.

SUMMARY OF THE INVENTION

The present invention is directed towards rectifying the above deficiencies and is concerned with an enclosure or bow net of rigid construction having means for allowing it to float in a temporary position in a partially submerged condition, simply by blowing or driving out air therefrom, or to assume a permanent position in which it is more or less fully immersed in the water. The object of the temporary position is to enable the user to gain access to the interior of the bow net in order to clean it or to care for the fishes. Thus, this position is assumed only during rather brief intervals; the bow net being otherwise in its permanent breeding position. In the permanent position, the bow net may be more or less plunged into the water, depending on the atmospheric or climatic conditions. Thus, in less sheltered bays, where the surface of the water is too choppy, the bow net will be fully immersed, but will be stabilized in the water without touching the bottom, while in more sheltered bays it will be possible to stabilize the bow net, always fully immersed, but made flush with the surface. The net can be any container means which allows the passage of water therethrough.

For this purpose, the bow net has, on the one hand, constant-buoyancy tanks and, on the other hand, variable-buoyancy tanks, the latter being filled by suitable means either with a buoyancy or with water.

Thus, when the permanent-buoyancy tanks are filled with air only, the bow net will be in a permanent fully immersed position, and when the variable-buoyancy tanks are filled with air, the bow net will buoy up to the surface to assume its temporary position.

According to one form of construction, the bow net is connected to a double caisson comprising a compartment always filled with air and forming a buoyancy chamber, and another compartment provided with a feeding port connected to a supply of air, and with a discharge port, the second compartment being always filled either with air or with water, depending on whether the assembly is to be immersed or not.

According to a second form of construction, the bow net comprises an axial central mast consisting of a hollow hermetically sealed tube to which is connected at least one caisson (e.g. spherical) having an intake and a discharge port, so that it can be filled with air or water.

According to a third form of construction, the bow net is connected to at least one outer caisson which is itself subdivided into two compartments, one compartment being watertight and the other capable of being filled either with air or water.

In order to be stabilized in the permanent or fully immersed breeding position, the bow net is provided with means for stopping its movement of immersion when it has reached the desired depth. Said means may consist of surface floats connected to the bow net by flexible straps. They may also consist of a plurality of sinkers or weights, preferably a chain having a plurality of links hanging freely underneath the assembly and coming into contact with the bottom of the sea when the assembly is immersed. This eases the strain on the assembly and makes it easy to keep the latter fully immersed in the water without making contact with the sea bottom.

In addition, movable sorting means may be provided which permit the sorting of fishes according to size.

Preferably, the bow net consists of a body of revolution and can turn around in such a way that all parts can emerge one after the other when the bow net is in the temporary position so as to permit its upkeep, repair, or cleaning.

BRIEF DESCRIPTION OF THE DRAWINGS

Other features and advantages of the invention will be better understood from a consideration of the following description which is offered by way of non-limitative example, and from the attached drawings wherein:

FIG. 1 is a schematic view showing the practical use of the device according to the present invention;

FIG. 2 is a view of the bow net in FIG. 1, on a large scale;

FIG. 3 is a front view of FIG. 2;

FIG. 4 is a view of a first modification;

FIG. 5 is a front view of FIG. 4;

FIG. 6 is a view of a second modification;

FIG. 7 is a view of a third modification;

FIG. 8 is a schematic view showing one mode of carrying into practice the device of FIG. 7;

FIG. 9 is a schematic view of a fourth modification;

FIG. 10 is a perspective view of a fifth modification;

FIG. 11 is a view of a detail of FIG. 10;

FIG. 12 is a partial view of a sixth modification;

FIGS. 13 and 14 are two schematic views showing a seventh modification and its operation;

FIG. 15 is a view of an eighth modification;

FIGS. 16–18 are three views of a ninth modification;

FIG. 19 is a view of a tenth modification;

FIG. 20 is a view of a detail of FIG. 19 taken along the line A—A; and

FIG. 21 is a view of a detail in FIG. 20 taken along the line B—B;

Now, referring to FIGS. 1-3, the assembly comprises a central caisson (in this case in the form of a cylinder), comprising throughout its length a horizontal partition wall 2 defining two compartments 3 and 4. Compartment 3 is hermetically sealed and functions as a float. Compartment 4 can be filled selectively with air or water.

For this purpose, compartment 4 has a feeding port 5 connected to a flexible duct 6 designed to receive compressed air, the end of said flexible duct 6 being attached to buoy 7 (FIG. 1). Compartment 4 has in the middle a tube 8 which is open at its end running perpendicularly downwards.

At each end, caisson 1 comprises a portion of shafts 9 and 10 on which slide the rings 11 to which are attached ropes 12, on whose ends chains 13 are suspended.

Caisson 1 serves as a central beam or mast provided with a bow net 14 consisting of a netting 15 or a net sufficiently fine to prevent the hatched or young fishes from passing therethrough, said netting being stretched on a metal frame of rods or cables 16 attached to hoops or braces 17.

On either side of the bow net are mounted one or more pairs of diametrically opposed rings 18, each ring 18 carrying a rope 12 to which chain 13 is attached.

When compartments 3 and 4 are filled with air, central caisson 1 floats and the bow net 14 is thus semi-emerged (FIGS. 1 and 2). This position is the temporary position in which practically half of bow net 14 emerges out of the water, allowing the user to intervene either to care for the fishes or to maintain the bow net in good condition.

When the end of flexible pipe 6 is opened and is made to communicate freely with the atmosphere, the air in compartment 4 escapes and the enclosure fills gradually with water through tube 8. The volume of compartment 3 is such that it is not enough to cause the assembly to float by itself when a certain weight of sinkers is suspended underneath, so that the assembly consisting of bow net 14, caisson 1 and sinkers 13 descends to the bottom. This movement continues until chains 13 touch the bottom of the sea (FIGS. 1 and 3). As the number of chain links 13 resting on the bottom of the sea increases, the total weight of sinkers that have dragged bow net 14 and caisson 1 diminishes until a state of equilibrium is attained; the assembly then floats between the surface and the bottom (fully immersed) without touching the bottom 19 (FIGS. 1 and 3).

The assembly is held back by mooring line 21 having mooring anchor 22. Thus, it can move under the influence of the tides or of deep-sea currents, but bow net 14 never rubs or chafes against the bottom, and only chains 13 scrape the bottom 19.

When flexible pipe 6, whose length is at least slightly more than the depth of immersion, is made to communicate with a source of compressed air, e.g. a compressor carried by boat 20, the water in compartment 4 is driven out by the compressed air and escapes through tube 8. When compartment 4 is completely filled with air, the buoyancy of caisson 1 is sufficient to lift bow net 14 and chains 13, whereupon the assembly moves toward the surface (FIGS. 1 and 2).

Bow net 14 is provided, in a known manner, with a door through which the equipment is maintained in good condition or through which the fishes can be fed, introduced, or withdrawn.

Since the assembly is perfectly symmetrical around its longitudinal axis, it can be made to rotate 180°, causing all the chains on the same side to pass thereabove: the immersed portion then lies on the surface and can easily be cleaned.

If the sea bottom is not flat, certain chains 13 may lie higher on the bottom than others, whereby bow net 14 will not be horizontal, so that a large quantity of water cannot escape through duct 8. To rectify this, two ducts 23 and 24 can be provided which, emanating from one end of the caisson, connect with duct 8. These ducts are rigid or flexible. Between the various ducts, the best discharge of water is assured by an appropriate setup of head losses.

In the two examples described above, the bow net is carried by a central caisson serving as its central frame or mounting, but the present invention is not limited to this particular form of construction. Indeed, the bow net and caisson may be connected in many different ways.

As an example, as shown in FIGS. 4 and 5 in which like reference symbols denote like elements, bow net 14 may be located on a central mast 30 consisting of a hollow hermetically sealed tube, said caisson 30 forming the constant-buoyancy tank. In the middle of said caisson 30 there is threaded a spherical caisson 31 forming the variable-buoyancy tank. Caisson 31 comprises a feeding port 32 joined to flexible duct 6, which is connected to buoy 7 and a discharge port 33 located at the lowest part of sphere 31. As in the case described earlier, the central caisson carries on its two ends sinkers 13, and bow net 14 carries on its two sides sinkers 13.

The operation of the device embodying the principles of the invention shown in FIGS. 4 and 5 is identical to that shown in FIGS. 1-3.

According to a second modification shown in FIG. 6, the same elements (denoted by the same reference symbols) may employ a bow net 14, whose shape, which is always a body of revolution, is that of a cylinder tapering at both ends so as to offer less resistance to the current. Moreover, according to this modification, central caisson 30, which consists of a constant-buoyancy tank, is connected not to one but to two spherical caissons 31a and 31b each provided, as in the case described earlier, with a feeding port 32 connected to duct 6, and with a lower discharge port 33. However, in this case, spherical caissons 31a and 31b are mounted such as to rotate on central cylindrical caisson 30 and they are each provided with a sinker 34, whose object is to keep ports 33 in a low position when bow net 14 is turned around.

FIG. 7 shows a third modification, comprising the same means as those described in FIG. 6, with the exception of elements 11, 12 and 13, which have been removed and replaced by an inverted arrangement consisting of two buoys 35 connected to both ends of caisson 30 by two cables 36. Once the air in variable-buoyancy tanks 31a and 31b has been removed and the tanks have been filled with water, the assembly starts to sink slowly until cables 36 are taut, and is then carried by buoys 35. Thus, cables 36 may have any desired length. For example, as shown in the drawing, they may have a length slightly less than the radius of bow net 14, so that the latter is slightly flush with the surface, a portion of the bow net remaining outside of the water when the latter is in the permanent breeding position. This permanent exposure to the free air causes the desiccation and destruction of the marine growths that could have attached themselves to the netting, causing fouling thereof. By making the bow net turn around at regular intervals (one or more days), the entire surface can be cleaned, with the exception of two conical areas located at each end. These areas can, in turn, be cleaned by filling caisson 31a with air and extending cable 36b, so that bow net 14 is placed in a slanting position (FIG. 8).

By varying the length of cables 36, the bow net can be immersed at the desired depth.

Two horizontal caissons may likewise be placed on either side of the bow net (FIG. 9).

According to another modification shown in FIG. 10, the caissons may be replaced by a cylindrical tube 23, which is closed at its upper end and open at its lower end and in which is immersed a tube 24 fastened by collar 25.

If tube 23 remains vertical, the volume between the tip of tube 23 and the base 26 of tube 24 forms the compartment which is always filled with air and constitutes the constant-buoyancy tank, while the volume between base 26 of tube 24 and the lower open end of tube 23 forms the compartment which is filled either with air or with water and constitutes the variable-buoyancy tank. Since tube 24 is connected to flexible tube 6 when air is forced thereinto, tube 23 is completely filled with air. On the other hand, if tube 6 is opened to atmospheric air, the air contained in tube 23 escapes and water enters until it comes in contact with end 26 of tube 24; from that moment the air in tube 23 can no longer escape.

Preferably, tube 23 is vertical, but it may also be oblique; its section may have any configuration.

Tightening means 25 allows independent adjustment of the level in tube 23 of end 26 of plunger tube 24.

As is apparent from FIG. 11, bow net 14 may have the form of a flat cylinder with a plurality of tubes 23 along its generating lines. As shown in FIG. 12, bow net 14 may also comprise the form of a cylinder with radially arranged twin compartments on its two end faces, that is to say, one of the two compartments 28 is watertight and one of the two compartments 29 is open and connected to flexible tube 6.

According to another modification, shown in FIGS. 13–15, bow net 43 is shaped like a spindle and is carried by caisson 41 consisting of a hollow hermetically sealed tube which forms at the same time a central brace or truss for bow net 43 and the constant-buoyancy tank.

Caissons 47 are mounted on both ends of caisson 41 using cables 46. Each caisson 47 forms a variable-buoyancy tank. For this purpose, each caisson is connected to flexible pipe 48 which, in turn, is connected to surface buoy 54 and has a fitting end and a stop cock. In order to provide a sturdy construction, tube 48 is preferably connected directly with the brace or truss of bow net 43 and extends as far as caissons 47 following cables 46. As in all the examples described earlier, each caisson 47 is open at its lower end. Moreover, there is attached to each caisson a sinker 51 comprising, for example, an anchor chain element; as in the previous cases, the assembly is preferably connected to a mooring anchor not shown herein.

It follows that in the permanent breeding position, bow net 43 is in a horizontal position close to the bottom. Air is forced through tube 48 into the two caissons 47, so that bow net 43 moves to the surface in a direction parallel to itself. On the surface, one of caissons 47 (FIG. 14) can be detached and, after driving the air out of the caisson that remains attached and refilling it with water, the bow net can be made to rock from side to side.

FIG. 15 shows a modification in which bow net 43 consists of a sphere, with tube-caisson 42 occupying a large diameter of the sphere. Advantageously, said sphere may consist of an assembly of panels such as shown at 57. This arrangement offers the advantage that bow net 43 can be made of prefabricated panels, whereby the rotation of the sphere around tube 42 is easier and the spherical shape is more suitable for offering resistance to the waves and the deep-sea currents.

Said sphere can be maintained by a single assembly consisting of caisson 47 and sinker 51, or it may consist of two opposing assemblies.

In the examples described above, it has been stated that when bow net 43 is in the state of immersion, it is in a stable position close to the sea bottom, with a specified number of chain links 51 resting on the bottom. However, it is possible to calculate the weight of sinker 51 in such a way that the bow net does not sink completely and is stabilized fully immersed below the surface of the water with a small portion of its volume emerging from the sea. Thus, for example, using a bow net 43 such as described and illustrated in FIGS. 13–15 and having a total length of 8 meters, the weight of the sinker(s) and the capacity of caisson 42 can be calculated such that the bow net is stabilized with 7 meters of its volume under water and 1 meter emerging; the fishes can thus be fed by throwing the food through the netting. This process can be of advantage in sheltered bays where the waves are not too large, because it greatly simplifies the feeding operations.

A bow net having a sinker 51 sufficiently heavy to cause the assembly to sink when caisson 47 is completely filled with water can also be utilized, the caisson being emptied only partially so that the assembly stabilizes in the fully immersed position, with only a small portion of the bow net emerging from the sea. As long as the waves are not too large, the bow net is left in this position and if there is a violent storm, the assembly is made to sink until it almost reaches the bottom.

In all the embodiments shown in FIGS. 13–15, tube-caisson 41 or 42 is placed in the middle of the enclosure. This arrangement, more convenient for reasons of symmetry, is not imperative and the caisson may be placed in any position.

FIGS. 16–18 show another embodiment in which like reference symbols denote like elements and which comprises a combination of the means described with reference to FIGS. 6 and 11. Bow net 14 is carried by central mast 42, which may be a solid tube and at each end of tube 42 there is placed a caisson 31 consisting of a sphere mounted such that it can rotate on said tube 42. Sphere 31 is stabilized by sinker 34, on each side of which is arranged an outlet 33a–33b. Opposite sinker 34 there is placed a plunger tube 26, whose length can be adjusted by tightening means 25. The length of tube 26 defines the portion of the sphere volume forming the constant-buoyancy tank. However, if necessary, one can modify at will the size of said volume by making the sphere pivot about tube 42, as illustrated in FIGS. 17 and 18. Valve 70 may also be provided for driving air out by acting on the sphere means.

Furthermore, caisson 31 may have a flattened shape such that a section taken along a plane passing through tube 42 is an ellipse.

This spherical shape offers the advantage that it is anchored more easily with a variable-air compartment and with a sinker which takes hold at the anchorage point of the mooring line. It is apparent that all the combinations of permanent-air and variable-air compartments and sinker also apply to this spherical shape construction.

Moreover, generally speaking, the permanent-air and variable-air compartments can be cleared either simultaneously or separately. Of course, the positioning of the enclosures at different levels and under different axes of rotation is dependent thereon.

In all of the above embodiments, the enclosure defined by bow net 14 or 43 is traversed by a central mast, but the invention is not limited to this particular form of construction.

In particular, bow net 14 may be formed by a triangular or polygonal combination, wherein the bow net itself has sufficient resistance that no central brace or truss is needed. In this case, two shafts 37 (FIG. 19) are arranged on the two ends of the longitudinal axis of the self-supporting structure thus formed, spherical caissons 31a and 31b as above described being threaded on said shafts 37. Each of said spherical caissons comprises a closed watertight compartment forming the constant-buoyancy tank, the other part forming the variable-buoyancy tank.

In this embodiment, it is of advantage to use a detachable and movable device such as described in the following with reference to FIGS. 19–21.

Inside bow net 14 (FIG. 19) there is inserted through the door a grate 58 which, in the embodiment shown, consists of six triangular segments 59 which may be made of fine thread, so that they can be flexible, and which are carried by seven rigid supports 60 jointed to central pivot 61. Preferably, as shown in FIG. 20, the two end segments are disposed such that they slightly jut out over the surface of the water, so that the fishes are prevented from jumping over grate 58. To keep the grate open in the manner of a fan, a stiffening rod 62 may be provided.

According to another modification (FIG. 20), segments 59 may be arranged in such a way as to form an aperture 63 in the central area around pivot 61, said aperture being capable of being closed by a rigid grate 64 which is put in place by suitable means.

In this case, the triangular strainer meshes 59 are so fine that no fish can pass therethrough and only those that are smaller than a certain size can pass through grate 64.

Fan-type grate 58 may be stationary, but it may also be movable so it can sweep up all the quantity of liquid in the bow net. In this case, two guide rails for grate 58 may be arranged along the walls of bow net 14.

One or more floating bodies 65 may likewise be arranged on the upper portion of grate 58 and on the lower portion of sinker 66, so that the grate is kept in the vertical position shown. The grate may have a hoisting gear controlled by operator 69 in order to move it from one end of bow net 14 to the other.

If the bow net is moored in water crossed by a fairly strong current, small sails or cones of the deep-sea anchor type may be attached to grate 58 which will drag grate 58 in the direction of the current. Thus, it is sufficient to place the grate at the upstream end of the bow net and to let it drift downstream under the influence of the current.

As shown in FIG. 21, each support 60 may likewise be formed from two hollow tubes 60a and 60b, each being connected to compressed-air pipe 67a or 67b. Tubes 60a are provided with a plurality of apertures 68a, and tubes 60b with apertures 68b. If compressed air is admitted into pipe 67a, this air will escape through apertures 68a of tubes 60a, and the assembly will be propelled in the opposite direction.

According to another modification (FIG. 19), there may be arranged inside the enclosure a grate 58a fixed in any desired position and a movable grate 58 which is moved toward the stationary grate. In this case, grate 58 is provided with meshes that are so small that the fishes cannot pass through, while grate 58a comprises a portion 64a whose meshes (or bars) are spaced such that only fishes of a size larger than a given value are held back.

FIG. 19 shows that if the upper portion of movable grate 58 is immobilized by suitable means, it will pivot upwards. This allows the ends of the bow net to be swept up completely if said ends have a configuration which substantially corresponds to the sweeping arc of the movable grate.

The invention being thus described, it will be obvious that the same may be varied in many ways. Such variations are not to be regarded as a departure from the spirit and scope of the invention, and all such modifications are intended to be included within the scope of the following claims.

What is claimed is:

1. A device for practicing marine aquaculture in the open sea comprising:
   container means which allows the passage of water therethrough for containing fishes or alevins therein, buoyancy means for controlling the buoyancy of the device comprising permanent-buoyancy means and variable-buoyancy means, said variable-buoyancy means being provided with inlet means for introducing a buoyancy gas thereto and also being provided with a permanently open downwardly directed discharge opening and descent limiting weight means including a plurality of weights suspended underneath said container means for limiting the descent of said container means completely to the bottom of the sea when the buoyancy of said variable buoyancy means is reduced or cancelled out.

2. The device according to claim 1, wherein said inlet means includes a feeding port connected to one end of a flexible pipe which is at least slightly longer than the depth of immersion of said bow net means the free end of said tube being carried by a buoy.

3. The device according to claim 1, wherein said container means has a spherical configuration and comprises a tube-caisson placed along a diameter of the sphere, said tube caisson being provided at each end with a variable-buoyance caisson.

4. A device according to claim 1, wherein said permanent-buoyancy means includes a hermetically sealed buoyant body.

5. A device according to claim 1, wherein said weights are located at various vertical distances below said container means.

6. A device according to claim 1, wherein said weights form a chain.

7. A device according to claim 1 wherein said container means includes a bow net.

8. A device according to claim 1, wherein said discharge port is a downwardly extending discharge tube.

9. A device according to claim 1, wherein said descent limiting weight means includes a plurality of chains.

10. The device according to claim 1, which includes a horizontal tubular element forming a central mast carrying a brace or truss on which is arranged said container means.

11. The device according to claim 10, wherein the tubular element comprises, a first hermetically sealed permanent-buoyancy tank and a variable-buoyancy tank.

12. The device according to claim 10, which includes hollow hermetically sealed central tubular caisson means forming at the same time said central mast and a constant-buoyancy tank, said variable-buoyancy means being connected to said central tubular caisson means.

13. The device according to claim 12, comprising a spherical variable-buoyancy means attached to said central caisson means in the center thereof and inside said container means.

14. The device according to claim 12, comprising two spherical variable-buoyancy means attached to said central caisson means at both ends thereof outside said container means.

15. The device according to claim 14, wherein said spherical caisson means is weighted and is mounted for pivotal movement on said central caisson means.

16. A device according to claim 14 wherein said spherical cassion means is mounted for rotational movement on said central cassion means and said spherical cassion means is provided with a weight which keeps said discharge port in a downwardly extending position.

17. The device according to claim 10, which comprises a rope or chain assembly mounted to rotate at each end of the tubular element and at least one pair of rope or chain assemblies mounted on each side thereof.

18. The device according to claim 10, wherein said container means has a tubular shape and is arranged radially about said tubular element.

19. A device according to claim 18, wherein said tubular container means is tapered at both ends.

20. The device according to claim 1, wherein said descent limiting means further includes cables connected to buoys, the length of said cables determining the level of immersion in the water.

21. The device according to claim 20, wherein said cables are shorter than the radius of said container means so that in the breeding position a portion of said bow net means extends above the water.

22. The device according to claim 1, wherein said variable-buoyancy means comprises at least one substantially vertical tube which is closed at its upper end and open at its lower end and into which is disposed a plunger tube connected to a supply of buoyancy gas, the lower end of said plunger tube defining the separation between the volume of the tube which is constantly filled with gas and the volume of the tube which can be filled selectively with gas or water.

23. The device according to claim 18, wherein said container means has a cylindrical configuration with a vertical axis and is connected to said variable buoyancy means which comprises a plurality of pairs of vertical tubes that are open at their bases.

24. The device according to claim 1, which comprises at least one pair of twin floats, one of which is at all times filled with gas, while the other is independently filled with either gas or water.

25. The device according to claim 24, wherein said container means has a cylindrical configuration with a horizontal axis and said floats comprise two cylindrical horizontal tubes placed on both sides of said bow net means.

26. The device according to claim 24, wherein said container means has a cylindrical configuration with a horizontal axis and includes a plurality of pairs of twin floats on either or both of the two longitudinal exterior faces of said bow net means.

27. The device according to claim 26, wherein said container means has a spindle-shaped configuration and is symmetrical.

28. The device according to claim 26, wherein said container means includes two symmetrical cones which are coupled together at their bases by said cylindrical container means.

29. The device according to claim 1 further including a grate or sifting means having a latticed surface and having a lower circumference corresponding to the circumference of the immersed portion of said container means and an upper circumference located slightly above the surface of the water, said latticed surface being movable so that all or part of the immersed volume of the container means can be swept.

30. The device according to claim 29, comprising two grates, one of which is stationary and the other movable, said movable grate having very fine meshes through which the fishes cannot pass and said stationary grate having calibrated meshes of a desired size.

31. The device according to claim 29, wherein said grate is pivotal about a horizontal pivot axis located near the upper circumference of said grate.

32. The device according to claim 29, wherein said movable grate is carried by at least two rails located inside said bow net means.

33. The device according to claim 32, wherein said grate includes at least one floating body arranged on its upper portion and a sinker on its lower portion so as to provide vertical positioning thereof.

34. The device according to claim 32, wherein said grate is moved mechanically by means of a hoisting gear.

35. The device according to claim 32, wherein said grate is moved by the current of the water passing through said bow net means.

36. The device according to claim 35, wherein said grate is provided with surfaces which permit it to be dragged by the current of the water.

37. The device according to claim 32, wherein said grate is moved by the reaction caused by jets of compressed air.

38. The device according to claim 29, wherein said grate comprises a fan which, in turn, comprises a plurality of radiating supports emanating from a central pivot, said supports defining in the spread-out position triangular segments whose surface consists of flexible nets.

39. The device according to claim 38, wherein the central area of said fan-type grate includes an aperture which can be closed at will by a sorting grate.

40. The device according to claim 39, wherein the radiating supports comprise hollow tubes having a plurality of apertures whose axis is normal to the surface of said grate, said tubes being connected to a supply of compressed air.

41. The device according to claim 40, wherein said tubes constitute twin tubes.

* * * * *